US007065636B2

(12) United States Patent
Inoue et al.

(10) Patent No.: US 7,065,636 B2
(45) Date of Patent: Jun. 20, 2006

(54) HARDWARE LOOPS AND PIPELINE SYSTEM USING ADVANCED GENERATION OF LOOP PARAMETERS

(75) Inventors: Ryo Inoue, Austin, TX (US); Ravi P. Singh, Austin, TX (US); Charles P. Roth, Austin, TX (US); Gregory A. Overkamp, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 513 days.

(21) Appl. No.: 09/745,104

(22) Filed: Dec. 20, 2000

(65) Prior Publication Data

US 2002/0078333 A1 Jun. 20, 2002

(51) Int. Cl.
*G06F 9/50* (2006.01)
*G06F 9/54* (2006.01)
(52) U.S. Cl. ............... 712/241; 712/218; 712/235
(58) Field of Classification Search ........... 712/241, 712/235, 218
See application file for complete search history.

(56) References Cited

U.S. PATENT DOCUMENTS

| 5,303,355 A | | 4/1994 | Gergen et al. | |
|---|---|---|---|---|
| 5,537,606 A | * | 7/1996 | Byrne | 712/7 |
| 5,734,880 A | | 3/1998 | Guttag et al. | |
| 5,898,866 A | * | 4/1999 | Atkins et al. | 712/241 |
| 6,003,128 A | * | 12/1999 | Tran | 712/241 |
| 6,085,315 A | * | 7/2000 | Fleck et al. | 712/241 |
| 6,567,895 B1 | * | 5/2003 | Scales | 711/140 |

FOREIGN PATENT DOCUMENTS

| EP | 0 374 419 | 6/1990 |
|---|---|---|
| EP | 0 605 872 | 7/1994 |
| JP | 3-214235 | 9/1991 |
| WO | WO02/37270 | 5/2002 |

* cited by examiner

*Primary Examiner*—Henry W. H. Tsai
*Assistant Examiner*—Tonia L. Meonske
(74) *Attorney, Agent, or Firm*—Fish & Richardson P.C.

(57) ABSTRACT

In one embodiment, a programmable processor is adapted to support hardware loops. The processor may include hardware such as a first set of registers, a second set of registers, a first pipeline, and a second pipeline. Furthermore, the processor may include a control unit adapted to efficiently implement the hardware when performing a hardware loop.

29 Claims, 7 Drawing Sheets

HARDWARE LOOPS AND PIPELINE SYSTEM USING ADVANCED GENERATION OF LOOP PARAMETERS

BACKGROUND

In designing a programmable processor, such as a digital signal processing (DSP) system, two competing design goals are processing speed and power consumption. Conventional processors include a variety of hardware designed to increase the speed at which software instructions are executed. The additional hardware, however, typically increases the power consumption of the processor.

One technique for increasing the speed of a programmable processor is a "hardware loop," which may be dedicated hardware designed to expedite the execution of software instructions within a loop construct. Hardware loops may reduce the number of clock cycles used to execute a software loop by caching the instructions in local registers, thereby reducing the need to fetch the same instruction from a memory device or instruction cache a plurality of times.

DESCRIPTION

Figure 1:
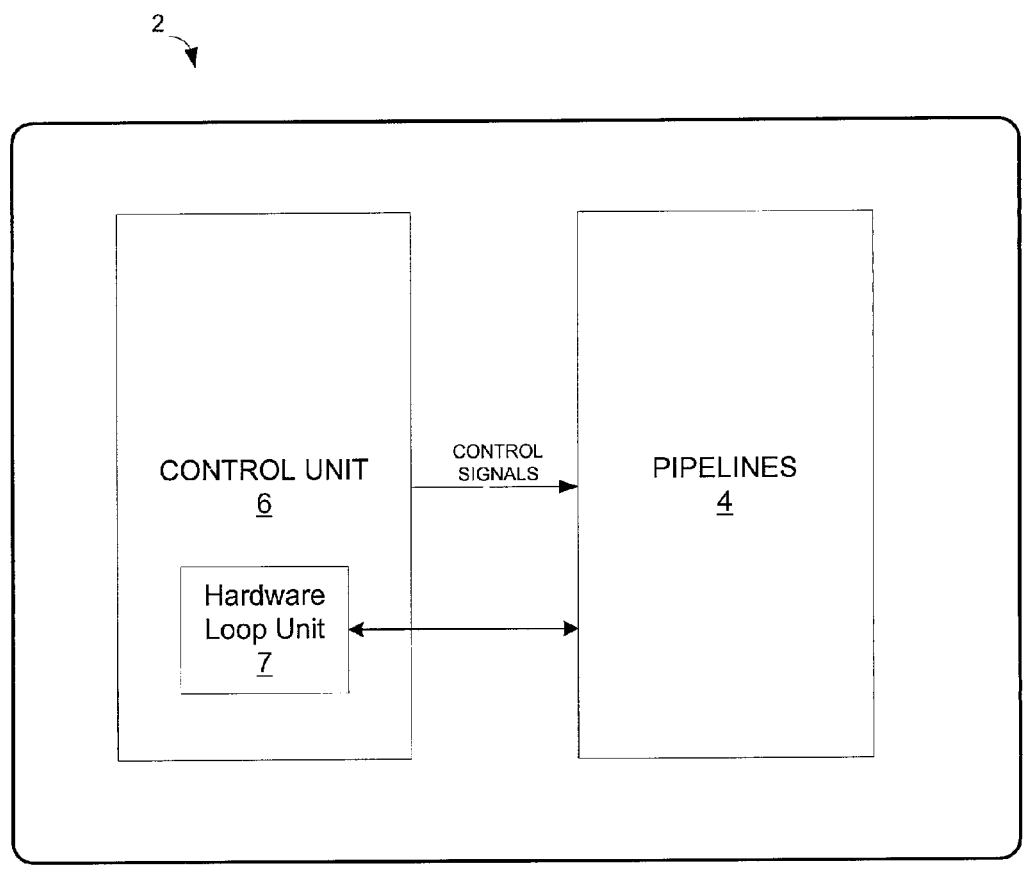
FIG. 1 is a block diagram illustrating an example of a programmable processor adapted according to an embodiment of the invention.

FIG. 1 is a block diagram illustrating a programmable processor 2 arranged to support efficient hardware loops in accordance with an embodiment of the invention. Processor 2 may include a control unit 6 that sends control signals to pipelines 4. Control unit 6 may include hardware loop unit 8 that may facilitate fast hardware loops without significantly increasing power consumption of processor 2.

In order to support hardware loops, a processor 2 may support a loop setup instruction that initializes hardware, such as a hardware loop unit 7, by setting entry and exit conditions for the loop. Entry and exit conditions may be defined by loop conditions: top, bottom and count. The top condition may define a first instruction (or top) of the loop. The bottom condition may define a last instruction (or bottom) of the loop. And the count condition may define a number of iterations of the loop.

Entry of a hardware loop may occur at the first "top match." A top match may occur when a program counter (PC) points to the top instruction of the loop. Exit of the hardware loop may occur at the last "bottom match," which may occur when the PC points to the bottom instruction of a loop.

By initializing the count at the first top match and decrementing the count at each bottom match, the hardware may keep track of when it has encountered the last bottom match. In this manner, the loop conditions top, bottom and count may define the entry and exit conditions of the hardware loop.

Processor 2 may include one or more pipelines 4 and a control unit 6. By way of example, the pipelines 4 may include one or more system pipelines, one or more data address generation pipelines, one or more execution unit pipelines, and one or more additional pipelines, as may be desired for a particular implementation. Control unit 6 may control the flow of instructions and/or data through the pipelines 4 during a clock cycle. For example, during the processing of an instruction, control unit 6 may direct the various components of the pipelines to decode the instruction and correctly perform the corresponding operation including, for example, writing the results back to memory.

Instructions may be loaded into a first stage of one or more pipelines 4 and processed through subsequent stages. A stage may process concurrently with the other stages. Data may pass between the stages in pipelines 4 during a cycle of the system. The results of an instruction may emerge at the end of the pipelines 4 in rapid succession.

Figure 2:
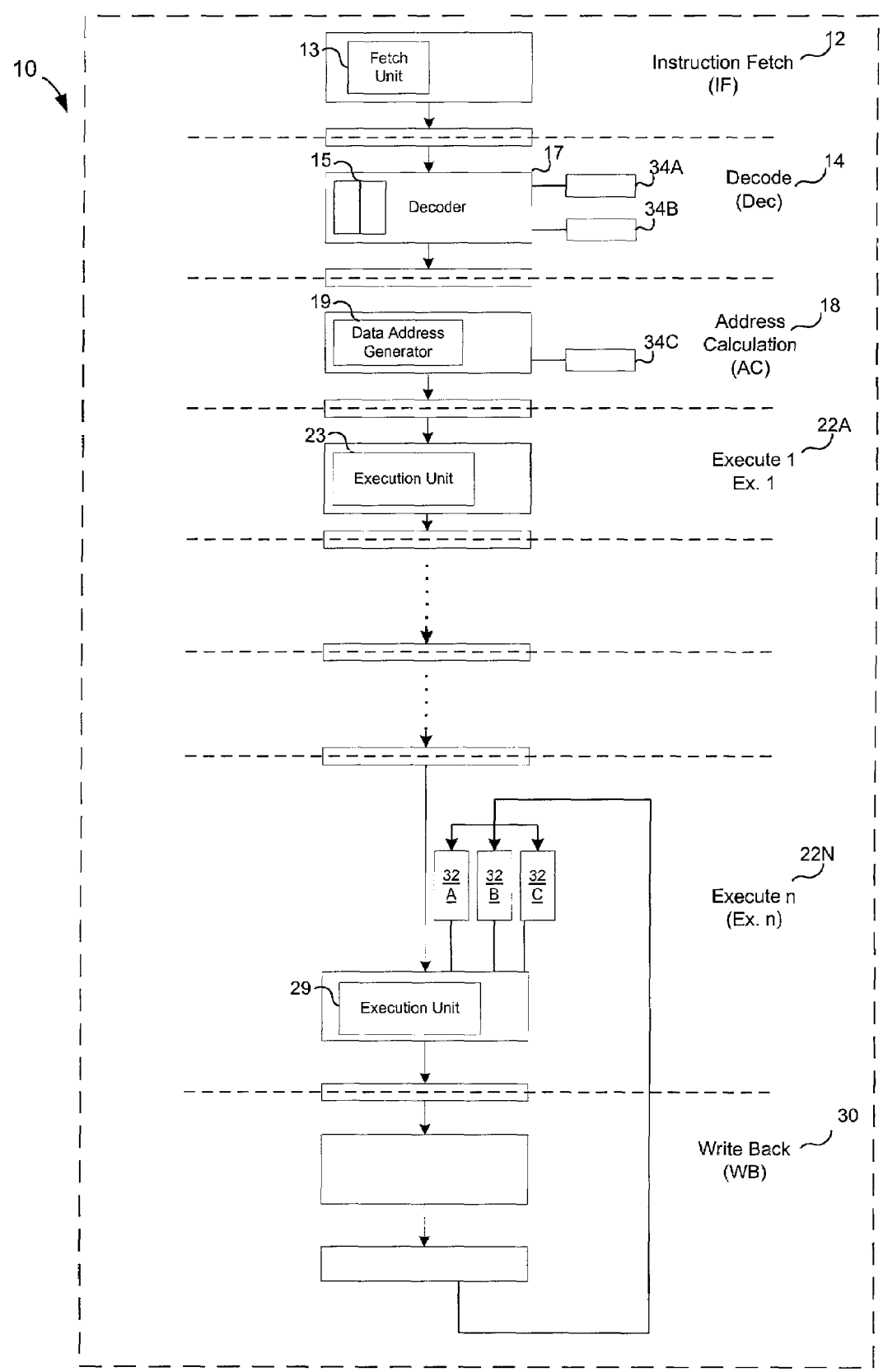
FIG. 2 is a block diagram illustrating a pipeline in accordance with an embodiment of the invention.

FIG. 2 is a block diagram illustrating an example pipeline in accordance with an embodiment of the invention. A pipeline 10 has multiple stages that may facilitate execution of multiple instructions during a single clock cycle. In pipeline 10, an instruction may enter the instruction fetch (IF) stage 12 during a first clock cycle. The instruction may then continue down the pipeline during subsequent clock cycles. Typically, another instruction enters the IF stage 12 during a subsequent clock cycle and then continues down the pipeline during subsequent clock cycles. Similarly, additional instructions enter the IF stage 12 during subsequent clock cycles respectively. The number of stages in the pipeline may define the number of instructions that the pipeline may service simultaneously.

The different stages of the pipeline may operate as follows. Instructions may be fetched during the IF stage 12 by a fetch unit 13 and decoded from instruction registers 15 during the DEC stage 14. During the AC stage 18, one or more data address generators 19 may calculate any memory addresses used to perform the operation. A data address generator 19 may contain one or more arithmetic logic units (ALU's) to facilitate the calculation.

During the execution stages (EX 1–EX n) 22A–22N, execution units 23 and 29 may perform specified operations such as, for example, adding or multiplying two numbers. Execution units may contain specialized hardware for performing the operations including, for example, one or more ALU's, floating-point units (FPU) and barrel shifters, although the scope of the invention is not limited in this respect. A variety of data may be applied to the execution units such as the addresses generated by data address generators, data retrieved from memory or data retrieved from data registers. During write back stage (WB) 30, the results may be written to a memory location or data registers external to the pipeline or to data registers in the pipeline such as architectural registers 32. The stages of pipeline 10 may include one or more storage circuits, such as a flip-flop, for storing data.

As mentioned above, processor 2 may support a loop setup instruction. The loop setup instruction may initialize a hardware loop by writing the boundaries of the hardware loop (e.g. top and bottom) to architectural registers 32. The loop setup instruction may also initialize a count in architectural registers 32, indicating the number of times the loop is to be completed. In addition, the loop setup instruction may define an offset, indicating the number of instructions that follow the loop setup instruction before the top of the loop is reached. After the hardware loop is initialized, the hardware loop may operate in the pipeline 10 until the exit condition of the loop has been satisfied (e.g. a bottom match with count equal to zero).

Architectural registers 32 are generally loaded once an instruction has committed, e.g., when the loop setup instruction exits the WB stage 30. Therefore, the entry and exit conditions stored in architecture registers 32 may not be updated until several clock cycles have passed from when the loop setup instruction enters pipeline 10. Because the entry and exit conditions may not be updated until several clock cycles have passed, delays on setting up hardware loops may exist. For example, if the first instruction in the loop enters pipeline 10 before the loop setup instruction has committed, the architectural registers may not be set up to identify the instruction as part of a loop. Moreover, this may increase as the depth of the pipeline increases.

In one embodiment, processor 2 may address these issues by maintaining a set of early registers 34 in the pipeline. As shown in FIG. 2, early registers ETop 34A and EBot 34B may reside in the decode stage while ECnt 34C may reside in AC stage.

Implementing a set of early registers 34 may increase processing speed of processor 2 by reducing or avoiding loop set up penalties. As described above, several clock cycles may pass between the time a loop setup instruction enters the pipeline and the time the architectural registers are written. However, the early registers may be loaded long before the loop setup instruction writes to the architectural registers. For this reason, implementing early registers may reduce the time it takes to setup hardware loops.

The early registers may be speculative registers used to predict or speculate the value of architectural registers. Unlike the architectural registers, the speculative registers may not be supported by the system's instruction set. Therefore, program code may not be used to access the speculative registers. For this reason, a programmer may not be able to move data in or out of the speculative registers the same way that he or she could with architectural registers.

Loading early registers may be done in several different ways. For instance, the early registers may be loaded simply as a result of performing a regular instruction register move to the architectural registers. In other words, the system may instruct the architectural registers to load the contents of some other register, and as a result, the early registers may be updated. Yet another way to load the registers is to load them from memory. In other words, the system may fetch the data from memory, load the architectural registers with that data, and update the early registers.

The problem with regular register moves or loads from memory, however, is that they may introduce loop setup penalties. These penalties may occur because the system may stall the pipeline until the data is available to be written. To avoid these penalties, a loop setup instruction may be used to load the early registers before the architectural registers get written.

The following example illustrates the syntax for invoking an exemplary loop setup machine instruction:

LSETUP (PC Relative Top, PC Relative Bottom) Counter=X

The PC Relative Top specifies the distance from the current instruction to the start of the loop (the Start Offset). The PC Relative Bottom specifies the distance from the current instruction to the end of the loop (the End Offset). In addition, the Counter variable may specify a counter register and a loop count indicating the number of iterations in the loop.

Figure 3:
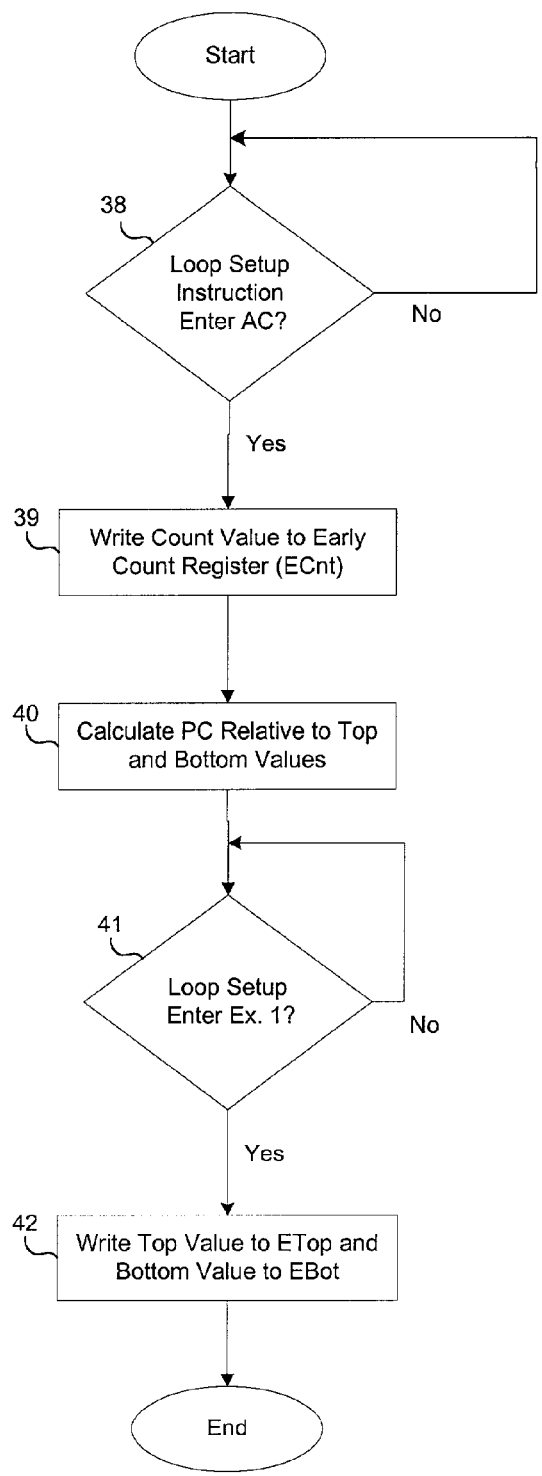
FIG. 3 is flow diagram illustrating an example process of loading early registers in accordance with an embodiment of the invention.

FIG. 3 is a flow diagram illustrating the timing of loading early registers in accordance with an embodiment of the invention. As described, the loop setup instruction may contain loop conditions in the form of a count value, a top value, and a bottom value. Collectively, these three values may define entry and exit conditions of a hardware loop.

The count value may represent the number of iterations that the loop will make. Once the loop setup instruction enters AC (38), the count value may be written to the ECnt register (39). Initially writing to the ECnt register may be done via a register move from data registers. In one mode of operation, the ECnt register may be written with data contained in pointer registers (PREGS) of a data address generation (DAG) pipeline. If necessary, an ALU in one of the pipelines may be used to calculate the count value from the loop setup instruction.

The top and bottom values may indicate which instruction is at the top of the loop, and which instruction is at the bottom of the loop. The top and bottom values in the loop setup instruction, however, may be program counter (PC) relative. Therefore, a calculation (40) in AC stage may be used to obtain the top and bottom values that will be written to ETop 34A and EBot 34B registers respectively. After the loop setup instruction enters EX 1 (41), the top and bottom values may be written to the ETop 34A and EBot 34B registers (42).

In accordance with an embodiment of the invention, system resources may be efficiently implemented. In this manner, the need for additional system hardware to handle hardware loops may be avoided. As mentioned above, the loop conditions of a hardware loop may be contained in a loop setup instruction. By efficiently reusing available ALU's contained in the processor, hardware loops may be set up without the need for dedicated hardware loop ALU's.

Figure 4:
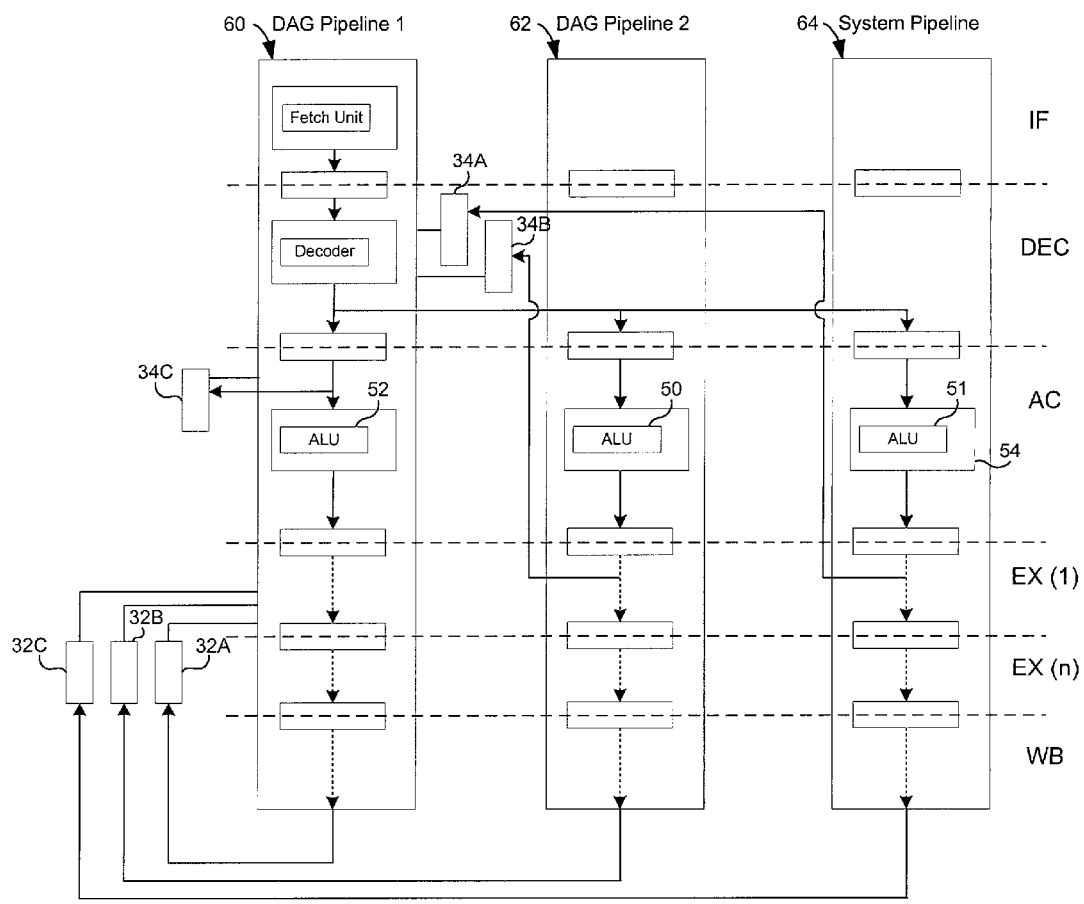
FIG. 4 is a block diagram illustrating the efficient use of one or more pipelines in accordance with an embodiment of the invention.

FIG. 4 is a block diagram illustrating the efficient use of one or more pipelines in accordance with an embodiment of the invention. A loop setup instruction may be fetched during the IF stage by a fetch unit and decoded from instruction registers (not shown) during the DEC stage 14. At this point, the loop setup instruction may be piped to available ALU's (50, 51) in different pipelines so that the loop conditions may all be calculated in parallel.

For instance, in one particular embodiment, an ALU 52 in a first pipeline (e.g. a first DAG pipeline 60) may be used to pass the count value and may perform any necessary shifting or calculation. In addition, an ALU 50 in a second pipeline (e.g. a second DAG pipeline 62) may be used to calculate the bottom value of a loop from the loop setup instruction. Moreover, an ALU 51 in a third pipeline (e.g. one contained in the branch unit 54 of a system pipeline 64) may be used to calculate the top value of a loop from the loop setup instruction. In this manner, the loop conditions may be calculated in parallel. Moreover, the respective ALU's may all be resources that are available whether or not the system is configured to handle hardware loops. Thus, by reusing these available resources, the forgoing implementation may avoid unnecessary increases in hardware to handle hardware loops.

After the loop conditions have been calculated, these conditions may be written to a set of early (or speculative) registers 34. The ETop register 34A may be loaded to point to the first instruction of the loop (or top of the loop). The EBot register 34B may be loaded to point to the last instruction of the loop (or bottom of a loop). The ECnt register 34C may be loaded to specify the number of times that the loop is to be repeated. In one embodiment, ECnt 34C counts downward, decrementing each time a bottom match is encountered.

In addition to writing the calculated loop conditions to the early registers 34, this data may also be piped to a set of architectural registers 32 that may get written in the write back stage. In accordance with another embodiment of the invention, this data may be piped down a number of available pipelines. In this manner, two or more of the architectural registers 32 may be written in parallel. Moreover, additional storage hardware (such as additional flip-flops) may be unnecessary to carry the loop conditions to WB.

In one particular embodiment, a first pipeline (e.g., DAG pipeline 60) may be used to carry the count variable to an architectural register 32A. In addition, a second pipeline (e.g., DAG pipeline 62) may be used to carry the top variable to an architectural register 32B. Moreover, a third pipeline (e.g., system pipeline 64) may be used to carry the bottom variable to an architectural register 32C. These respective pipelines may all be resources that are available whether or not the system is arranged to handle hardware loops. Thus, by reusing these available resources, the forgoing implementation may avoid unnecessary increases in hardware to handle hardware loops.

Reusing the pipelines realizes several advantages. For instance, if only a single pipeline were used to calculate the loop conditions, it might take several clock cycles to perform all necessary calculations using a single ALU. Moreover, if only a single pipeline were used to propagate the loop conditions, it may take additional clock cycles to pass the data to WB. For these reasons, the reuse of additional pipelines may provide for improved system performance by avoiding these additional loop setup penalties. In addition, as described above, reusing existing pipelines may realize a reduction in hardware within the processor. Moreover, it may facilitate writing loop conditions to two or more registers in parallel.

Figure 5:
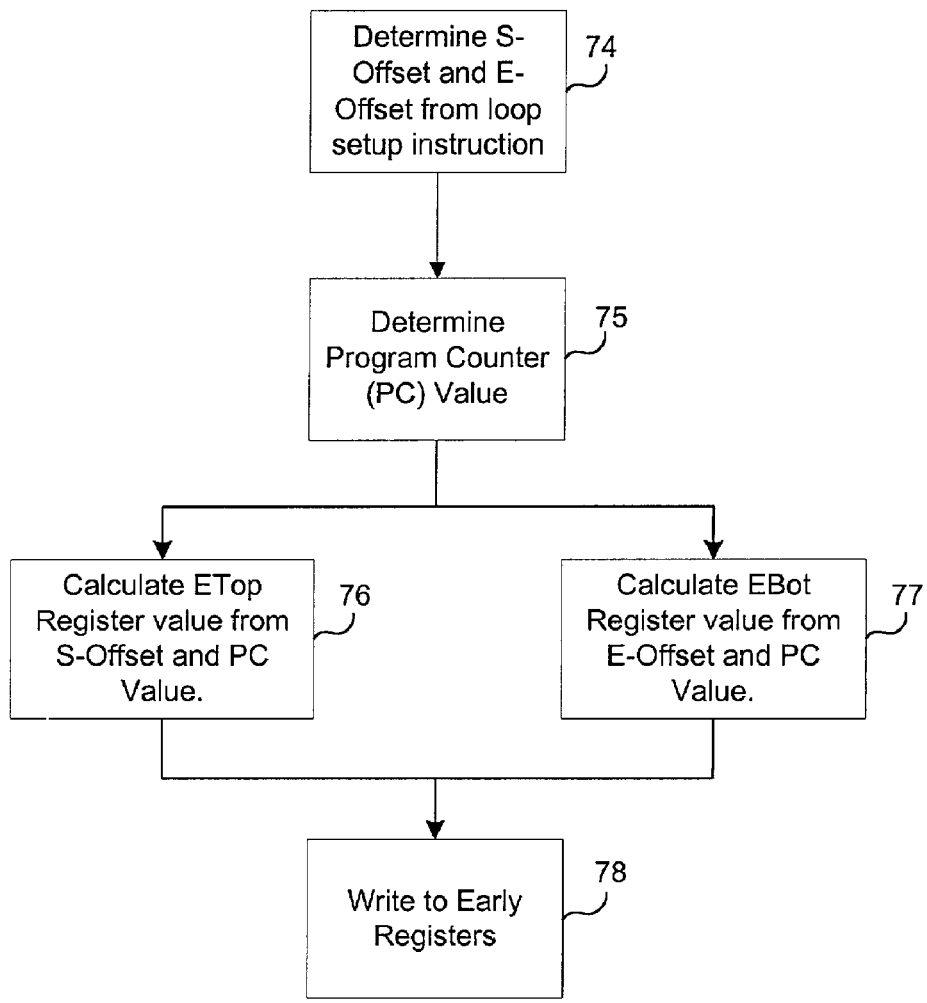
FIG. 5 is a flow diagram illustrating one example use of a loop setup instruction to determine early register values in accordance with an embodiment of the invention.

FIG. 5 is a flow diagram illustrating one mode of operation of calculating early register values in accordance with an embodiment of the invention. According to one format, the loop setup instruction may specify several setup variables including a Start Offset (S-Offset) and an End Offset (E-Offset). The S-Offset may specify the distance in the instruction stream from the loop setup instruction to the first instruction in the loop. Similarly, the E-Offset may specify the distance in the instruction stream from the loop setup instruction to the last instruction in the loop.

For instance, if the first instruction in the loop is the instruction immediately following the loop setup instruction, then the S-Offset would be the width of the loop setup instruction. If, in the instruction stream, there is one instruction between the loop setup instruction and the first instruction in the loop, then the S-Offset would be the width of the loop setup instruction and the one instruction. Similarly, if there are two instructions between loop setup and the first instruction, then the S-Offset would be width of the loop setup instruction and the two instructions.

As shown in FIG. 5, the S-Offset and E-Offset are typically specified by a loop setup instruction (74). However, the loop-setup instruction specifies the offsets relative to the program counter (PC). Therefore, the PC value may also be determined (75). The PC value and S-Offset may then be used to calculate ETop register data (76). Moreover, the PC value and E-Offset may be used to calculate EBot register data (77). Once calculated, the early register data may be written to the early registers (78). Again, by reusing available ALU's in the system, the early register data may be calculated in parallel, and done so without an unnecessary hardware increases.

Comparing FIG. 5 with FIG. 2 illustrates exemplary timing when writing the ETop and EBot registers. Steps (74) and (75) may occur in DEC stage 14. Calculations steps (76) and (77) may occur in AC stage 18. Therefore, the write step (78) may occur in EX 1 stage 22A.

Figure 6:
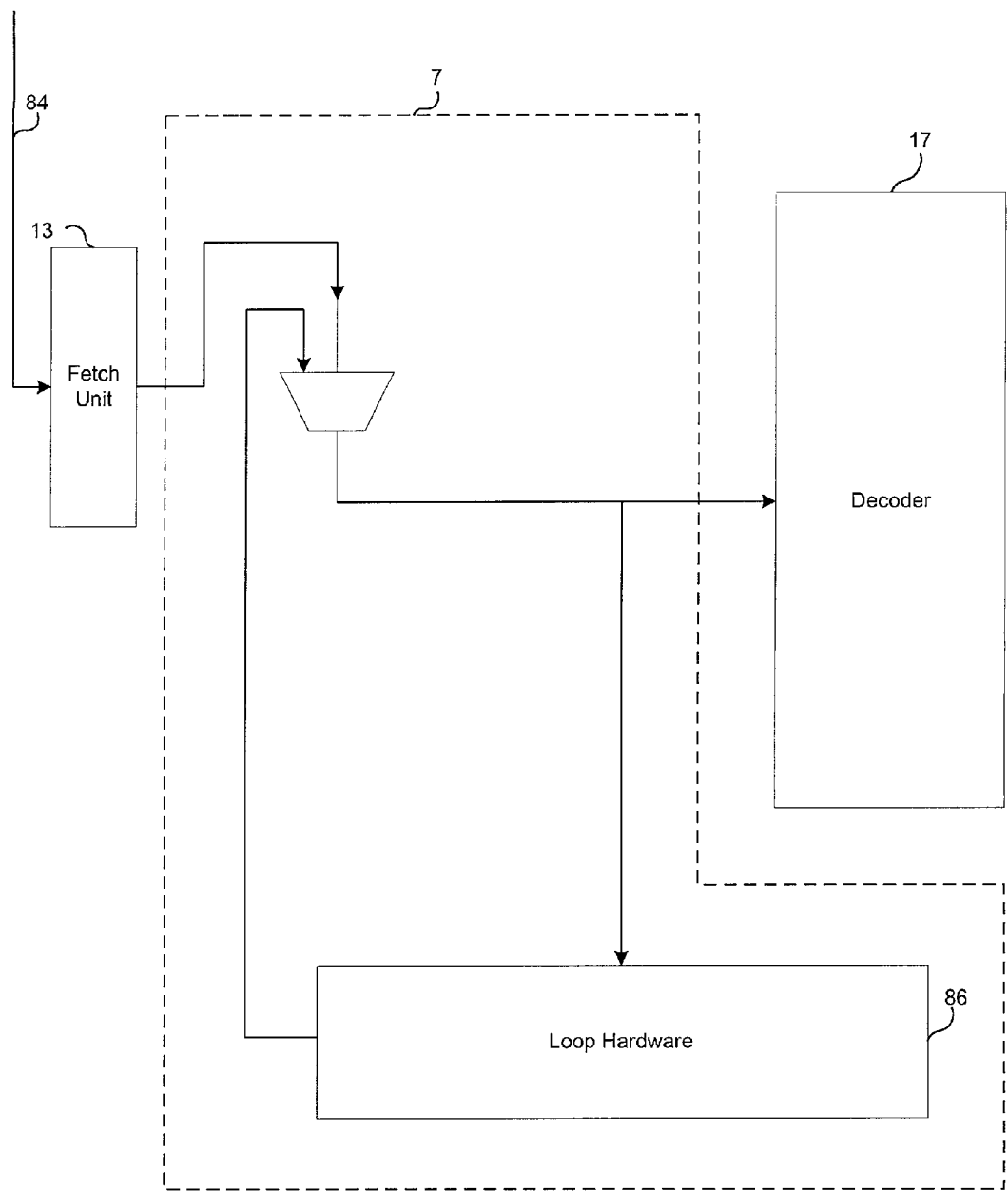
FIG. 6 is a circuit block diagram illustrating one embodiment of a hardware loop unit.

Once loaded, the early registers may be used to set up hardware loops. FIG. 6 is a block diagram illustrating one embodiment of a hardware loop unit 7 connected to an instruction fetch (IF) unit 13 and a decoder unit 17 of pipeline 10. In one embodiment, the early registers may be used to detect a loop in the stream of instructions 84. Loop hardware 86 may then be loaded with one or more loop instructions. Once loaded, the loop instructions may be issued again and again from loop hardware. Thus, if a hardware loop is detected, then one or more of the loop instructions may be fetched only once by IF unit 13, and then issued repeatedly from hardware loop unit 7.

Figure 7:
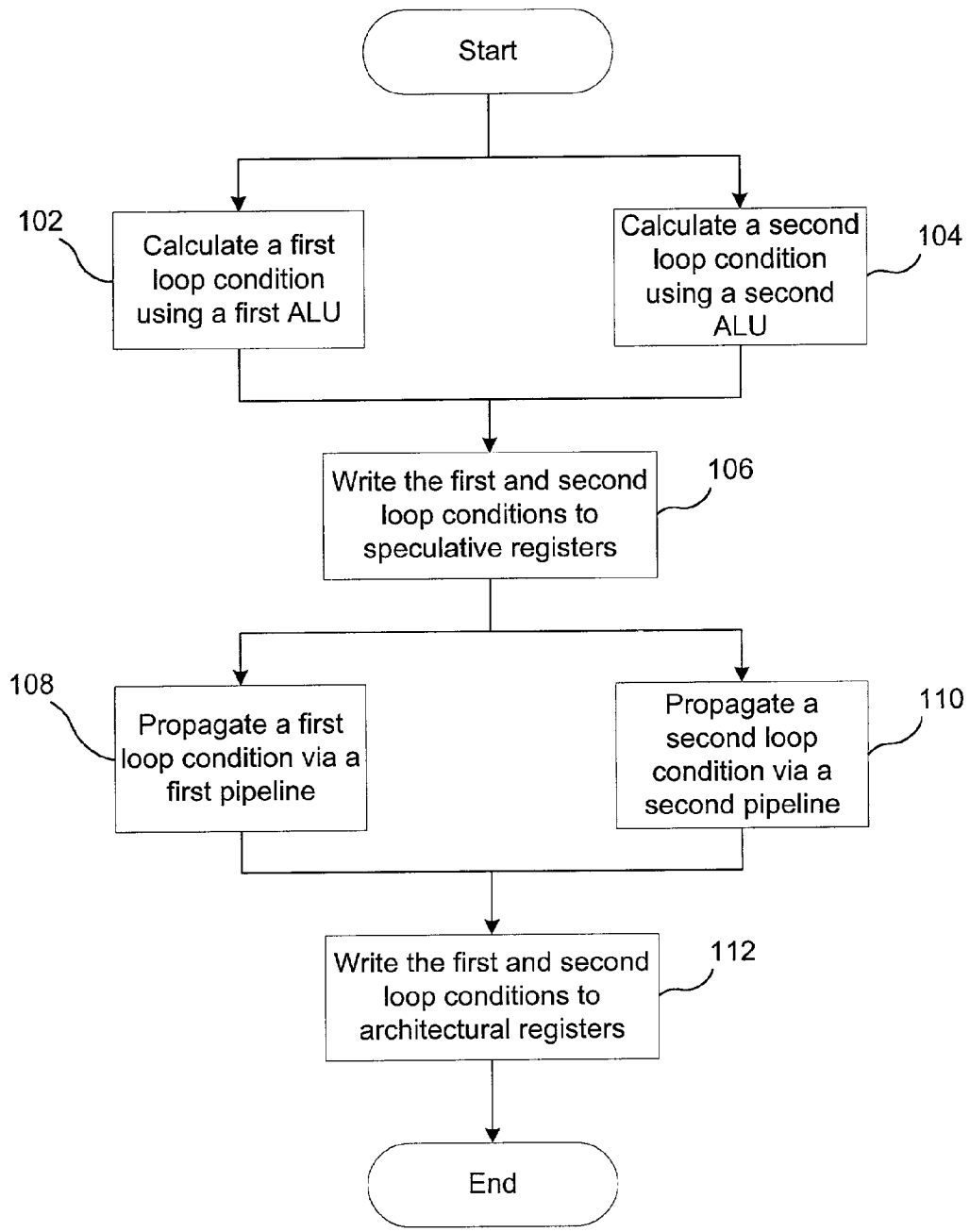
FIG. 7 is a flow diagram illustrating the reuse of hardware in accordance with an embodiment of the invention.

FIG. 7 is a flow diagram illustrating the reuse of hardware in accordance with an embodiment of the invention. Using available hardware, when a loop setup instruction is received, a first loop condition and a second loop condition may be calculated in parallel (102 and 104). These conditions may be calculated, for instance, using first and second arithmetic logic units (ALUs). Moreover, these ALUs may reside in different pipelines. Alternatively, additional loop conditions may be calculated using additional ALUs residing in other available pipelines.

Once the loop conditions have been calculated (102 and 104), they may be written to speculative registers (106) and used to set up a hardware loop. In addition, the loop conditions may be propagated to a set of architectural registers via a first pipeline and a second pipeline respectively (108 and 110). If additional loop conditions need to be propagated, additional pipelines may be used. Once propagated, the loop conditions may be written to a set of architectural registers (112).

Calculating loop conditions from a loop setup instruction may require the use of one or more ALUs. Moreover, propagating the calculated conditions to a set of architectural registers may require storage circuitry (e.g. a flip flop) at every pipe stage, for every loop condition. By efficiently implementing available system resources, hardware loops may be setup without the need for additional hardware loop ALUs and flip-flops.

Various embodiments of the invention have been described. For example, the reuse of hardware not traditionally used in a hardware loop context has been described for implementation within a processor. The processor may be implemented in a variety of systems including general purpose computing systems, digital processing systems, laptop computers, personal digital assistants (PDA's) and cellular phones. In this context, the reuse of hardware discussed above may be readily used to facilitate efficient hardware loops. In such a system, the processor may be coupled to a memory device, such as a FLASH memory device or a static random access memory (SRAM) that stores an operating system and other software applications. These and other embodiments are within the scope of the following claims.

What is claimed is:

1. A method comprising:
   fetching, by a first pipeline of a pipelined processor, loop conditions corresponding to a particular instance of a loop setup instruction for a first hardware loop;
   first propagating a first of said loop conditions of said first hardware loop corresponding to the particular instance of a loop setup instruction via said first pipeline of a pipelined processor;
   piping a second of said loop conditions from said first pipeline of the pipelined processor to a second pipeline of the pipelined processor; and
   second propagating in parallel with said first propagating the second of said loop conditions for said first hardware loop corresponding to the particular instance of a loop setup instruction via said second pipeline of the pipelined processor.

2. The method of claim 1, further comprising:
   writing the loop conditions to a first set of registers prior to propagating the loop conditions for said first hardware loop and using said registers to begin calculating parameters based on said loop conditions for said first hardware loop prior to said propagating, and
   writing the loop conditions for said first hardware loop to a second different set of registers after propagating the loop conditions, wherein the second different set of registers comprises one or more architectural pipeline registers.

3. The method of claim 2, further comprising generating the loop conditions of the hardware loop prior to writing the loop conditions to the first set of registers.

4. The method of claim 3, wherein generating the loop conditions comprise calculating at least one of the loop conditions from program counter relative data in the particular instance of the loop setup instruction.

5. A method of claim 1, further comprising propagating a third of said loop conditions via a third pipeline.

6. A method comprising:
   first calculating a first loop condition of a first hardware loop from a particular instance of a loop setup instruction using a first arithmetic logic unit in a first pipeline;
   pipe a loop condition from the first pipeline to a second pipeline;
   second calculating a second loop condition of said first hardware loop from a loop setup instruction piped from the first pipeline using a second arithmetic logic unit in the second pipeline; and
   using results of said first calculating and said second calculating for propagating said loop conditions in each of the first and second pipelines to hardware registers associated with calculating parameters of said first hardware loop; and
   beginning to calculate said parameters using said first hardware loop, based on said loop conditions, prior to said propagating of said loop conditions in each of the first and second pipelines to the hardware registers.

7. The method of claim 6, further comprising writing the first and second loop conditions to a first set of registers.

8. The method of claim 7, further comprising propagating the first loop condition to a second set of registers via a first pipeline.

9. The method of claim 8, further comprising propagating the second loop condition to the second set of registers via a second pipeline.

10. The method of claim 6, further comprising:
    calculating a third loop condition of the hardware loop from the particular instance of the loop setup instruction using a third arithmetic logic unit in a third pipeline; and
    writing the first, second and third loop conditions to a first set of registers.

11. The method of claim 6, wherein calculating the first loop condition and calculating the second loop condition occur in parallel.

12. An apparatus comprising:
    a first pipeline including a first arithmetic logic unit and a second pipeline including a second arithmetic logic unit, and
    a control unit coupled to the pipelines, the control unit adapted to:
      obtain loop setup instructions for a first hardware loop from a computer program, the loop setup instructions associated with a particular instance of execution of the first hardware loop;
      pipe a loop setup instruction from the first pipeline to the second arithmetic unit in the second pipeline;
      first calculate a first loop condition of said particular instance of execution of the first hardware loop from one of said loop setup instructions using the first arithmetic logic unit in the first pipeline; and
      second calculate a second loop condition of said particular instance of execution of the first hardware loop from the piped loop setup instruction using the second arithmetic logic unit in the second pipeline, in parallel with said first calculate.

13. The apparatus of claim 12, the apparatus further comprising a first set of registers coupled to the control unit, wherein the control unit is further adapted to write the first and second loop conditions of the particular instance of execution of the hardware loop to the first set of registers.

14. The apparatus of claim 13, the apparatus further comprising a third pipeline coupled to the control unit, the third pipeline including a third arithmetic logic unit, the control unit further adapted to:
    calculate a third loop condition of the particular instance of execution of the hardware loop from the loop setup instruction using the third arithmetic logic unit in the third pipeline; and
    write the first, second and third loop conditions of the particular instance of execution of the hardware loop to the first set of registers.

15. The apparatus of claim 14, the apparatus further comprising a second set of registers coupled to the control unit, the control unit further adapted to:
    propagate at least one of the loop conditions to the second set of registers via the first pipeline;
    propagate at least one of the loop conditions to the second set of registers via the second pipeline; and
    propagate at least one of the loop conditions to the second set of resisters via the third pipeline.

16. The apparatus of claim 13, the apparatus further comprising a second set of registers coupled to the control unit, wherein the control unit is further adapted to propagate at least one of the loop conditions to the second set of registers via the first pipeline.

17. The apparatus of claim 16, the control unit further adapted to propagate at least one of the loop conditions to the second set of registers via the second pipeline.

18. The apparatus of claim 13, wherein the first set of registers are speculative registers.

19. The apparatus of claim 12, wherein at least one of the pipelines is a data address generation pipeline.

20. The apparatus of claim 12, wherein at least one of the pipelines is a system pipeline.

21. An apparatus comprising a set of registers, a first pipeline, and a second pipeline; and
   a control unit coupled to the set of registers, the first pipeline and the second pipeline, the control unit adapted to:
      first propagate at least one loop condition of a particular instance of execution of a first hardware loop to the set of registers via the first pipeline;
      pipe at least one loop of the particular instance of execution of said first hardware loop to the second pipeline;
      second propagate at least one piped loop condition of the particular instance of execution of said first hardware loop to the set of registers via the second pipeline; and
      begin calculating data using said first hardware loop, prior to propagating the at least one loop condition of a particular instance of execution of said first hardware loop in the first pipeline to the set of registers and prior to propagating the at least one loop condition of the particular instance of execution of said first hardware loop in the second pipeline to the set of registers.

22. The apparatus of claim 21, wherein the set of registers are a second set of registers, the apparatus further including a first set of registers coupled to the control unit, wherein the control unit is further adapted to:
   write the loop conditions of the particular instance of execution of the hardware loop to the first set of registers prior to propagating at least one of the loop conditions to the second set of register.

23. The apparatus of claim 21, wherein at least one of the pipelines is a data address generation pipeline.

24. The apparatus of claim 21, wherein at least one of the pipelines is a system pipeline.

25. A system comprising:
   a static random access memory device;
   a processor coupled to the static random access memory device, wherein the processor includes a first set of registers, a first pipeline, a second pipeline, and a control unit adapted to:
      pipe a loop setup instruction from the first pipeline to a second arithmetic unit in the second pipeline;
      first calculate a first loop condition of a particular instance of execution of a first hardware loop from the loop setup instruction using a first arithmetic logic unit in the first pipeline;
      second calculate a second loop condition of said particular instance of execution of the first hardware loop from the loop setup instruction using the second arithmetic logic unit in the second pipeline, in parallel with the first calculate; and
      write the first and second loop conditions of said particular instance of execution of the first hardware loop to the first set of registers.

26. The system of claim 25, the processor including a third pipeline, the control unit further adapted to:
   calculate a third loop condition of the particular instance of execution of the hardware loop from the loop setup instruction using a third arithmetic logic unit in the third pipeline; and
   write the first, second and third loop conditions of the particular instance of execution of the hardware loop to the first set of registers.

27. A system comprising:
   a static random access memory device;
   a processor coupled to the static random access memory device, wherein the processor includes a first set of registers, a second set of registers, a first pipeline, a second pipeline, and a control unit adapted to:
      write loop conditions of a first hardware loop to the first set of registers;
      propagate at least one of the loop conditions of said first hardware loop to the second set of registers via the first pipeline;
      pipe at least one of the loop conditions of said first hardware loop to the second pipeline;
      propagate at least one of the piped loop conditions of said first hardware loop to the second set of registers via the second pipeline; and
      begin calculating data using said first hardware loop prior to propagation of the at least one of the loop conditions of said first hardware loop in the first pipeline to the second set of registers and prior to propagation of the at least one of the loop conditions of said first hardware loop in the second pipeline to the second set of registers.

28. The system of claim 27, the processor further including a third pipeline, the control unit further adapted to propagate at least one of the loop conditions to the second set of registers via the third pipeline.

29. The system of claim 27, the control unit further adapted to:
   calculate a first loop condition of the hardware loop from a loop setup instruction using a first arithmetic logic unit in the first pipeline; and
   calculate a second loop condition of the hardware loop from the loop setup instruction using a second arithmetic logic unit in the second pipeline.

* * * * *